United States Patent [19]
Jacquier

[11] 3,818,095
[45] June 18, 1974

[54] COMPOSITIONS OF 1,2-DILOWER ALKYL-3(AND/OR4)-ARYL-3-PYRAZOLINES AND SALTS THEREOF AND METHOD OF LOWERING BLOOD SUGAR LEVELS WITH SAME

[75] Inventor: Robert Jacquier, Montpellier, France

[73] Assignee: Schering Corporation, Bloomfield, N.J.

[22] Filed: Apr. 12, 1972

[21] Appl. No.: 243,427

[52] U.S. Cl. .............................................. 424/273
[51] Int. Cl. ............................................ A61k 27/00
[58] Field of Search .................................... 424/273

[56] References Cited
UNITED STATES PATENTS
3,350,407  10/1967  Flechter et al. .................... 260/310

OTHER PUBLICATIONS

Chemical Abstracts vol. 55 (1961) 5472.

*Primary Examiner*—Stanley J. Friedman
*Assistant Examiner*—Frederick E. Waddell
*Attorney, Agent, or Firm*—Mary S. King

[57] ABSTRACT

Pharmaceutical compositions containing as active component a 1,2-dilower alkyl-3(and/or 4)-aryl-3-pyrazoline, or an acid addition salt or a quaternary salt thereof are described, along with methods of using same. These active components exhibit hypoglycemic activity as evidenced by their ability to lower blood sugar levels.

26 Claims, No Drawings

COMPOSITIONS OF 1,2-DILOWER ALKYL-3(AND/OR 4)-ARYL-3-PYRAZOLINES AND SALTS THEREOF AND METHOD OF LOWERING BLOOD SUGAR LEVELS WITH SAME

BACKGROUND OF INVENTION

This invention relates to novel pharmaceutical compositions and to the method of using said compositions.

More specifically, this invention relates to novel compositions comprising a pharmaceutically acceptable carrier and a 1,2-dilower alkyl-3(and/or 4)-aryl-3-pyrazoline or a pharmaceutically acceptable acid addition salt or a pharmaceutically acceptable alkyl halide quaternary salt thereof for use in lowering blood sugar levels in warm blooded animal subjects, and to the process of using such compositions to lower blood sugar levels in warm blooded animal subjects.

SUMMARY OF INVENTION

The invention sought to be patented in its composition aspect resides in the concept of an orally administrable pharmaceutical composition suitable for the lowering of blood sugar levels in warm blooded animal subjects comprising a pharmaceutically acceptable carrier and an effective amount of a compound selected from the group consisting of 1,2-dilower alkyl-3(and/or 4)-aryl-3-pyrazolines of the following structural formula I, the pharmaceutically acceptable acid addition salts and pharmaceutically acceptable quaternary salts thereof:

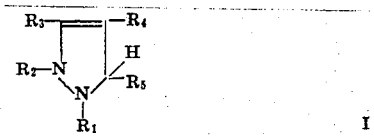

I wherein each of $R_1$ and $R_2$ is a lower alkyl; and each of $R_3$, $R_4$ and $R_5$ is a member selected from the group consisting of hydrogen, a hydrocarbon radical having up to 10 carbon atoms, and a hydrocarbon radical having up to 10 carbon atoms substituted by a substituent selected from the group consisting of halogen and lower alkoxy;

with the proviso that at least one of $R_3$ and $R_4$ must be phenyl or phenyl substituted by a member selected from the group consisting of halogen, lower alkyl and lower alkoxy;

and with the proviso that when $R_3$ is hydrogen and $R_4$ is phenyl or substituted phenyl, $R_5$ is hydrogen.

The invention sought to be patented in its process aspect resides in the concept of a process for the lowering of blood sugar levels in warm blooded animal subjects which comprises orally administering to such subjects an effective blood sugar lowering amount of a compound selected from the group consisting of 1,2-dilower alkyl-3(and/or 4)-aryl-3-pyrazolines of above structural formula I, the pharmaceutically acceptable acid addition salts and pharmaceutically acceptable quaternary salts thereof.

The composition and process aspects of this invention are preferably carried out utilizing pharmaceutically acceptable acid addition salts of compounds of formula I wherein $R_1$ and $R_2$ are methyl and wherein $R_3$ is phenyl or phenyl substituted by methyl. Particularly preferred are compositions containing an effective blood sugar lowering amount of a perchloric acid addition salt of a 1,2-dimethyl-3-phenyl(or tolyl)-3-pyrazoline of formula I and the process of orally administering said preferred compositions to warm blooded animal subjects for the lowering of blood sugar levels in said subjects.

DETAILED DESCRIPTION OF INVENTION

The active components of the compositions of this invention are 1,2-dilower alkyl-3(and/or 4)-aryl-3-pyrazolines of formula I or the pharmaceutically acceptable acid addition salts thereof or the pharmaceutically acceptable quaternary salts thereof.

Included within the term "lower alkyl" are hydrocarbon radicals having up to four carbon atoms including methyl, ethyl, n-propyl, iso-propyl, n-butyl, iso-butyl, and tert-butyl.

By the term "hydrocarbon radicals having up to 10 carbon atoms" are included alkyl radicals (both straight chain and branched) such as methyl, ethyl, iso-propyl, cyclohexyl, octyl and decyl; aralkyl radicals such as benzyl; and aryl radicals such as phenyl, tolyl (o, m, and p), xylyl, and p-(tert-butyl)-phenyl.

Included among the active components of the compositions of the present invention are compounds of formula I wherein $R_1$ and $R_2$ are methyl such as:
1,2,3-trimethyl-4-phenyl-3-pyrazoline,
1,2,3-trimethyl-4-(p-chlorophenyl)-3-pyrazoline,
1,2-dimethyl-3-(p-chlorophenyl)-3-pyrazoline,
1,2-dimethyl-4-phenyl-3-pyrazoline,
1,2-dimethyl-3-(p-fluorophenyl)-3-pyrazoline,
1,2-dimethyl-3-(p-bromophenyl)-3-pyrazoline,
1,2-dimethyl-3-(p-methoxyphenyl)-3-pyrazoline,
1,2-dimethyl-3-(m-fluorophenyl)-3-pyrazoline,
1,2,5-trimethyl-3-phenyl-3-pyrazoline,
1,2,4-trimethyl-3-phenyl-3-pyrazoline,
1,2-dimethyl-3,4-diphenyl-3-pyrazoline,
1,2-dimethyl-3,5-diphenyl-3-pyrazoline,
1,2-dimethyl-3-phenyl-3-pyrazoline,
1,2-dimethyl-3-(p-tolyl)-3-pyrazoline,
1,2-dimethyl-3-(m-tolyl)-3-pyrazoline,
1,2-dimethyl-3-(o-tolyl)-3-pyrazoline,
1,2-dimethyl-3-(2',4'-dimethylphenyl)-3-pyrazoline,
1,2-dimethyl-3-(3',4'-dimethylphenyl)-3-pyrazoline,
1,2,4,5-tetramethyl-3-phenyl-3-pyrazoline, and
1,2-dimethyl-4-ethyl-3-phenyl-3-pyrazoline.

Also included among the active components of the compositions of this invention are the pharmaceutically acceptable quaternary salts of the 3-pyrazolines of formula I which are defined by formula II hereinbelow:

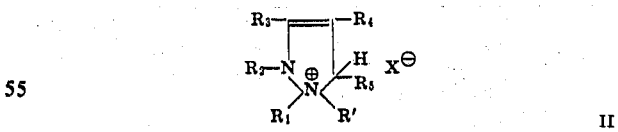

II wherein $R_1$, $R_2$, $R_3$, $R_4$ and $R_5$ are as hereinabove defined for formula I, R' is lower alkyl, and X is a pharmaceutically acceptable anion, e.g. chloride, bromide, iodide, p-toluenesulfonate and methanesulfonate.

Typical quaternary salts of formula II include 1,1,2,3-tetramethyl-4-phenyl-3-pyrazolinium iodide (a compound of formula II wherein R', $R_1$, $R_2$ and $R_3$ are methyl, $R_4$ is phenyl, $R_5$ is hydrogen, and X is iodide), 1,2-dimethyl-1-ethyl-3-pyrazolinium chloride, and 1,1,2-trimethyl-3-phenyl-3-pyrazolinium bromide, and the corresponding p-toluenesulfonates and methanesulfonates.

The quaternary salts of formula II are prepared utilizing known techniques such as by treating a 1,2-dilower alkyl-3(and/or 4)-aryl-3-pyrazoline of formula I with a lower alkyl halide at a temperature in the range of from 0°C to about 200°C with or without a solvent, such as a lower alkyl alcohol, for a time of from 1 minute to 24 hours in an open vessel or sealed bomb.

In general, compounds embracing the quaternary anions, if not available directly on synthesis, are obtained by application of a suitable anion exchange method carried out according to general procedures known in the art.

Preferred compositions of this invention have as an active component a pharmaceutically acceptable acid addition salt (particularly the perchlorate salt) of a 1,2-dilower alkyl-3(and/or 4)-aryl-3-pyrazoline of formula I. In the formation of the acid addition salts, the double bond between the carbons at positions 3 and 4 of the pyrazolines of formula I shifts to between the nitrogen at position 2 and the carbon at position 3 so that the acid addition salts of this invention are defined by following formula III:

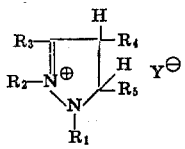

III wherein $R_1$, $R_2$, $R_3$, $R_4$ and $R_5$ are as defined hereinabove for formula I and Y is a pharmaceutically acceptable anion such as, for example, chloride, bromide, iodide, tartrate, sulfate, phosphate, nitrate, succinate and, preferably, perchlorate.

The perchloric acid addition salts of formula III, i.e., those compounds wherein Y is perchlorate, are a preferred species of the active components of the compositions of this invention because they are stable, crystalline salts which are easily isolated and purified and compounded into the compositions of this invention.

Preferred among the perchloric acid addition salts defined by formula III are those wherein $R_1$ and $R_2$ are methyl including 1,2-dimethyl-3-(p-chlorophenyl)-2-pyrazolinium perchlorate (a compound of formula III wherein $R_1$ and $R_2$ are methyl, $R_3$ is p-chlorophenyl, $R_4$ and $R_5$ are hydrogen and Y is perchlorate),
1,2-dimethyl-3-(p-fluorophenyl)-2-pyrazolinium perchlorate,
1,2-dimethyl-3-(p-bromophenyl)-2-pyrazolinium perchlorate,
1,2-dimethyl-3-(p-methoxyphenyl)-2-pyrazolinium perchlorate,
1,2-dimethyl-3-(m-fluorophenyl)-2-pyrazolinium perchlorate,
1,2,3-trimethyl-4-(p-chlorophenyl)-2-pyrazolinium perchlorate,
1,2,3-trimethyl-4-phenyl-2-pyrazolinium perchlorate,
1,2-dimethyl-4-phenyl-2-pyrazolinium perchlorate,
1,2-dimethyl-3,4-diphenyl-2-pyrazolinium perchlorate,
1,2-dimethyl-3,5-diphenyl-2-pyrazolinium perchlorate,
1,2-dimethyl-3-phenyl-2-pyrazolinium perchlorate,
1,2,4-trimethyl-3-phenyl-2-pyrazolinium perchlorate,
1,2-dimethyl-3-(m-tolyl)-2-pyrazolinium perchlorate,
1,2-dimethyl-3-(p-tolyl)-2-pyrazolinium perchlorate,
1,2-dimethyl-3-(3',4'-dimethylphenyl)-2-pyrazolinium perchlorate,
1,2,5-trimethyl-3-phenyl-2-pyrazolinium perchlorate,
1,2,4,5-tetramethyl-3-phenyl-2-pyrazolinium perchlorate, and
1,2-dimethyl-4-ethyl-3-phenyl-2-pyrazolinium perchlorate.

Of the foregoing, particularly valuable as hypoglycemic agents, as evidenced by their ability to lower blood sugar levels in warm blooded animals are 1,2-dimethyl-3-phenyl(or 3-tolyl)-2-pyrazolinium perchlorates of formula III having a hydrogen, methyl or phenyl group at C-4 and a hydrogen or methyl group at C-5.

The pharmaceutically acceptable acid addition salts of formula III are conveniently prepared utilizing known techniques such as by treating a 1,2-dilower alkyl-3(and/or 4)-aryl-3-pyrazoline of formula I with at least a substantially equimolar amount of the chosen pharmaceutically acceptable acid in an aqueous solution or in an organic solvent such as methanol or ethanol. The solid salt then precipitates from solution as a crystalline product, or is obtained upon evaporation of the solvent or upon addition of a non-polar solvent such as ether, dioxane, and the like. Among the acids which can be used to prepare preferred pharmaceutically acceptable acid addition salts of formula III in the abovedescribed manner are those containing pharmaceutically acceptable anions such as, for example, hydrochloric acid, hydrobromic acid, nitric acid, sulfuric acid, phosphoric acid, acetic acid, lactic acid, citric acid, tartaric acid, oxalic acid, benzoic acid, succinic acid, methanesulfonic acid, ethanesulfonic acid, benzenesulfonic acid, p-toluenesulfonic acid and, preferably, perchloric acid.

The 1,2-dilower alkyl-3(and/or 4)-aryl-3-pyrazolines of formula I from whence are derived the quaternary alkyl halide salts of formula II and the pharmaceutically acceptable acid addition salts of formula III can be prepared via several processes.

Process A

A convenient one-step procedure for preparing compounds of formula I wherein $R_1$, $R_2$, $R_3$ and $R_4$ are as defined hereinabove for formula I and $R_5$ is hydrogen, is illustrated by the following reaction scheme:

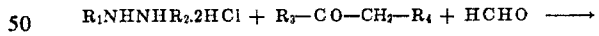

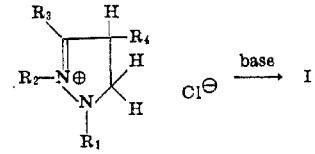

The process may be accomplished by refluxing an alcoholic solution of the acid addition salt of the 1,2-dilower alkylhydrazine (e.g. dimethylhydrazine dihydrochloride) and an equimolar quantity of a ketone (e.g. acetophenone), together with formaldehyde, the molar quantity of formaldehyde being preferably about twice that of the dialkylhydrazine acid addition salt. The thereby formed acid addition salt of a 1,2-dilower alkyl-3-phenyl(or substituted phenyl)-3-pyrazoline, i.e. a compound of formula III (e.g. 1,2-dimethyl-3-phenyl-2-pyrazolinium dihydrochloride) is then neutralized with base to give a free 3-pyrazoline of formula I (e.g. 1,2-dimethyl-3-phenyl-3-pyrazoline).

Process B

Alternatively, 1,2-dilower alkyl-3-aryl-3-pyrazolines of formula I in which $R_5$ is hydrogen may be prepared by heating at reflux temperature an alcoholic solution of 1,2-dilower alkylhydrazine with an equimolar quantity of a Mannich base as shown schematically below wherein $R_1$, $R_2$, $R_3$ and $R_4$ are as defined hereinabove for formula I and R' is lower alkyl:

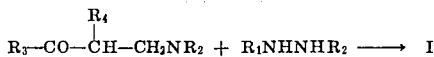

In carrying out the above-illustrated reaction, the Mannich base starting compounds are prepared via known procedures by reacting a ketone with formaldehyde and a dialkyl amine salt.

Process C

A novel process for the preparation of those compounds of formula I in which $R_5$ is hydrogen follows the reaction scheme below wherein $R_1$, $R_2$, $R_3$ and $R_4$ are as defined hereinabove for formula I:

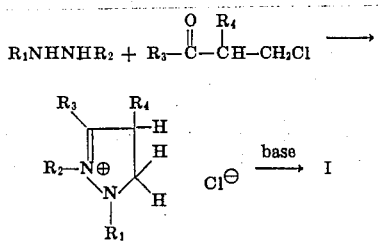

The reaction is carried out by refluxing the hydrazine and the ketone in an alcoholic solution, followed by neutralizing the mixture with a base such as KOH and NaOH. The ketone starting compounds are obtained according to standard methods.

Process D

The 1,2-dilower alkyl-3(and/or 4)-aryl-3-pyrazolines of formula I (including those wherein $R_5$ is other than hydrogen) are conveniently prepared by the action of 1,2-dilower alkylhydrazine (e.g. 1,2-dimethylhydrazine) on α-ethylenic ketones (e.g. propenyl ketones) in the presence of catalytic quantities of acid, e.g. p-toluenesulfonic acid or hydrochloric acid, whereby are formed 1,2-dilower alkyl-3(and/or 4)-aryl-3-pyrazolines of formula I as shown schematically below wherein $R_1$, $R_2$, $R_3$, $R_4$ and $R_5$ are as hereinabove defined by formula I:

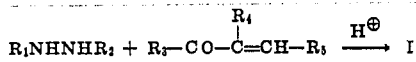

By this process, treatment of phenyl propenyl ketone, i.e., $R_3$ is phenyl, $R_5$ is methyl, with dimethylhydrazine in ethanol at reflux temperature in the presence of catalytic quantities of p-toluenesulfonic acid yields 1,2,5-trimethyl-3-phenyl-3-pyrazoline (a compound of formula I wherein $R_1$, $R_2$ and $R_5$ are methyl, $R_3$ is phenyl and $R_4$ is hydrogen).

In the above reaction, by substituting other 1,2-dilower alkylhydrazines (e.g. 1,2-diethylhydrazine) for 1,2-dimethylhydrazine, there is obtained the corresponding 1,2-dilower alkyl-3-pyrazoline (e.g. 1,2diethyl-5-methyl-3-phenyl-3-pyrazoline).

It is obvious that a mixture of two final compounds as shown below is obtained if the substituents $R_1$ and $R_2$ are not the same in the starting compound:

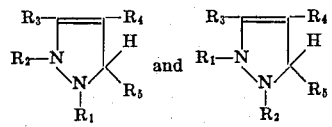

The mixture may be used as such in therapeutic composition; the two compounds may, however, also be separated by applying standard techniques such as fractional crystallization of the perchloric acid addition salts.

In general, when the substituents $R_1$ and $R_2$ in the starting compounds are dissimilar, product mixtures are obtained in all the processes disclosed herein, said product mixtures being separable utilizing standard techniques.

This process (D) is also conveniently carried out utilizing an acid addition salt (e.g. the hydrochloride of the dialkylhydrazine reagent) as the source of the catalytic quantity of acid. Thus, treatment of an α-ethylenic ketone (e.g. phenyl propenyl ketone) with the hydrochloride of 1,2-dimethylhydrazine (or other 1,2-dilower alkyl hydrazine) results in formation of a 2-pyrazolinium hydrochloride intermediate which upon treatment with base yields a 1,2-dilower alkyl-3-pyrazoline (e.g. 1,2,5-trimethyl-3-phenyl-3-pyrazoline).

Process E

A useful method for preparing penta-substituted compounds of formula I, i.e., when each of $R_1$, $R_2$, $R_3$, $R_4$ and $R_5$ is other than hydrogen, is by reduction of a pyrazolium quaternary salt, e.g. reduction by means of lithium aluminum hydride of a pyrazolium quaternary iodide of formula IV as shown hereinbelow wherein $R_1$, $R_2$, $R_3$, $R_4$ and $R_5$ are as defined for formula I:

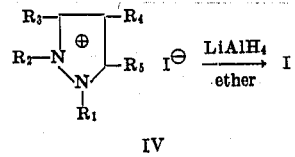

IV

In the above reaction, the requisite pyrazolium iodide salt may be prepared from the corresponding pyrazole by reaction with an alkyl halide, e.g. methyl iodide, according to known procedures. Thus, for example, 1,4,-5-trimethyl-3-phenylpyrazole upon reaction with methyl iodide in a sealed tube at 100°C yields 1,2,4,5-tetramehtyl-3-phenylpyrazolium iodide which upon reaction in ether with lithium aluminum hydride yields a 3-pyrazoline of formula I, i.e. 1,2,4,5-tetramethyl-3-phenyl-3-pyrazoline.

The 1,2-dilower alkyl-3(and/or 4)-aryl-3-pyrazolines of formula I, the pharmaceutically acceptable alkyl halide quaternary salts thereof of formula II, and the pharmaceutically acceptable acid addition salts thereof of formula III are the active components of the compositions of this invention; they exhibit hypoglycemic activity in warm blooded animals which indicates them to be useful as medicaments in the lowering of blood sugar levels. When the active components (i.e. compounds of formulae I, II, or III) are administered orally to 1-alanine loaded fasted mice ($CF_1$) or fasted guinea pigs, a reduction of blood sugar is observed. The active components of this invention in aqueous solutions or aqueous carboxymethylcellulose suspensions are administered by gavage to 24-hour fasted mice made hyperglycemic by the administration of l-alanine, or to fasted guinea pigs. Plasma glucose is determined either with the Technicon Autoanalyzer or fluorometrically using the Hexokinase-glucose-6-phosphate dehydrogenase coupled assay. Data is expressed as the percent change of blood glucose in an animal treated with a pyrazoline of this invention as compared with the average blood glucose concentration of a placebo injected group. The results show that the active components of the present invention are useful in lowering the blood glucose concentrations of warm blooded animals. Thus, for example, the perchloric acid addition salt of 1,2,4-trimethyl-3-phenyl-3-pyrazoline (i.e. 1,2,4-trimethyl-3-phenyl-2-pyrazolinium perchlorate) produces about a 60 to 70 percent reduction in plasma glucose in mice and in guinea pigs when administered orally at a dose of 25 mg./kg.

The active components of this invention may be used for the lowering of blood glucose levels in warm blooded animals at an oral dose of from about 1 to about 200 mg. per kilogram of body weight per day.

Of the active components of this invention, a particularly preferred species are the perchloric acid addition salts of 1,2-dimethyl-3-phenyl(or 3-tolyl)-2-pyrazolines having a hydrogen, methyl or phenyl group at C-4 and a hydrogen or methyl group at C-5 in view of their superior ability to lower blood sugar levels in warm blooded animals. Additionally, it has been discovered that compounds of this preferred species also exhibit anti-obesity properties as evidenced by their ability to inhibit lipogenesis when administered via the oral route to male adult Charles River rats (CD strain). Thus, for example, the perchloric acid addition salt of 1,2,4-trimethyl-3-phenyl-3-pyrazoline, i.e., of 1,2,4-trimethyl-3-phenyl-2-pyrazolinium perchlorate, inhibits lipogenesis when administered orally to male Charles River rats at a dose of about 30 mg./kg. The combination of hypoglycemic and anti-obesity properties exhibited by the preferred species of the active components of the compositions of this invention render them of particular value as hypoglycemic agents in view of the known association of obesity with hyperglycemia in warm blooded animals.

In connection with the use of the 1,2-dilower alkyl-3(and/or 4)-aryl-3-pyrazolines and the pharmaceutically acceptable alkyl halide quaternary salts and pharmaceutically acceptable acid addition salts thereof in the process of lowering blood sugar levels in warm blooded animals, it is to be noted they are administered together with a pharmaceutically acceptable carrier to form the compositions of this invention and that such administration can be carried out in both single and multiple dosages. The active components of this invention as hypoglycemic agents can be incorporated into various pharmaceutical forms for oral administration such as tablets, capsules, pills, elixirs and so forth, for immediate or sustained release by combining the suitable carriers. The compositions of this invention may be in the form of dosage units for a single therapeutic dose or in small units for multiple dosages or in larger units for division into single doses. The daily dosage in warm blooded animals via the oral route usually ranges from about 1 mg. to about 200 mg. per kilogram body weight. Obviously, in addition to the active compounds of formulae I, II and III, the compositions of this invention are comprised also of a pharmaceutically acceptable carrier including excipients, binders, fillers and other therapeutically inert ingredients necessary in the formulation of the pharmaceutical compositions of this invention.

Preferred for use as active components in the compositions and process of this invention are compounds of formula III wherein $R_1$ and $R_2$ are methyl and $R_3$ is phenyl or tolyl, and particularly those wherein $R_4$ is hydrogen, methyl or phenyl and $R_5$ is hydrogen or methyl. Of particular value are the perchloric acid addition salts of formula III, i.e., compounds wherein Y is perchlorate.

It is to be understood that included within the scope of this invention are compositions having hypoglycemic activity which contain compounds of formulae I, II and III wherein one or more of substituents $R_1$, $R_2$, $R_3$, $R_4$ or $R_5$ is different from but, to one skilled in the art, obvious equivalents of the substituents specifically described herein. For example, a composition having hypoglycemic activity comprising a compound of formulae I, II and III wherein a substituent $R_3$, $R_4$ or $R_5$ is a hydrocarbon having up to 12 carbon atoms (e.g. wherein $R_3$ is cyclohexylphenyl) is considered equivalent to the compositions specifically described herein and as being included within the scope of the claimed invention.

The examples which follow serve to illustrate the invention as described hereinabove, but the invention is not to be construed as limited in scope thereby.

Example 1

1,2,4-Trimethyl-3-phenyl-3-pyrazoline

A. To 300 ml. absolute ethanol add 0.3 mole propiophenone (40 g.), 0.3 mole dimethylhydrazine dihydrochloride (40 g.), 0.54 moles paraformaldehyde (16.2 g.) and 1 ml. concentrated hydrochloric acid, and heat at reflux temperature for 5 hours. Neutralize with aqueous sodium hydroxide, then concentrate the solution to a residue comprising 1,2,4-trimethyl-3-phenyl-3-pyrazoline. Purify by distillation, b.p.=80°–90°C/1.5 mm. Hg.

B. By substituting butyrophenone for propiophenone in the above procedure, there is obtained 1,2-dimethyl-4-ethyl-3-phenyl-3-pyrazoline.

C. In the above procedure A, by using other 1,2-dialkyl-hydrazines such as 1,2-diethylhydrazine or 1,2-di-(n-propyl)-hydrazine instead of 1,2-dimethylhydrazine, there is obtained the corresponding 1,2-diethyl or 1,2-di-n-propyl derivative, i.e., 1,2-diethyl-3-phenyl-4-methyl-3-pyrazoline or 1,2-di-(n-propyl)-3-phenyl-4-methyl-3-pyrazoline, respectively.

Example 2

1,2-Dimethyl-3-phenyl-3-pyrazoline

To 90 ml. of absolute ethanol add 0.1 mole of β-dimethylaminopropiophenone (Mannich base prepared by reaction of acetophenone, paraformaldehyde and dimethylamine hydrochloride) and 0.1 mole of 1,2-dimethylhydrazine. Heat the reaction mixture at reflux temperature for 12 hours, then evaporate the solvent in vacuo to a residue comprising 1,2-dimethyl-3-phenyl-3-pyrazoline. Purify by distillation, b.p.=115°–120°C/20 mm. Hg.; yield = 11–12 g.

Example 3

1,2-Dimethyl-3-substituted-3-pyrazolines

Essentially follow the procedure described in Example 1 to prepare the compounds listed below using in each case the appropriate ketone, together with dimethylhydrazine dihydrochloride, paraformaldehyde, and small quantities of concentrated hydrochloric acid. Isolate and purify the 1,2-dimethyl-3-phenyl-3-pyrazolines thereby obtained in a manner similar to that described in Example 1:
1,2-dimethyl-3-(p-tolyl)-3-pyrazoline,
b.p.=100°–105°C/20 mm. Hg. (m.p. = 60°C),
1,2-dimethyl-3-(pchlorophenyl)-3-pyrazoline,
b.p.=100°–105°C/20 mm. Hg. (m.p. = 18°–20°C),
1,2-dimethyl-3-(p-fluorophenyl)-3-pyrazoline,
b.p.=80°–90°C/0.1 mm. Hg.,
1,2-dimethyl-3-(p-bromophenyl)-3-pyrazoline,
b.p.=105°C/0.1 mm. Hg. (m.p. = 30°C (hexane)),
1,2-dimethyl-3-(p-methoxyphenyl)-3-pyrazoline,
b.p.=110°–120°C/0.01 mm. Hg.,
1,2-dimethyl-3-(2',4'-dimethylphenyl)-3-pyrazoline,
b.p.=105°–110°C/20 mm. Hg.,
1,2-dimethyl-3-(3',4'-dimethylphenyl)-3-pyrazoline,
b.p.=110°–115°C/20 mm. Hg.,
1,2dimethyl-3-(m-tolyl)-3-pyrazoline,
b.p.=90°–95°C/15 mm. Hg.,
1,2-dimethyl-3-(o-tolyl)-3-pyrazoline,
b.p.=90°–95°C/15 mm. Hg., and
1,2-dimethyl-3-(m-fluorophenyl)-3-pyrazoline,
b.p.=100°–105°C/20 mm. Hg.

Alternatively, the compounds of this example can be prepared according to the procedure of Example 2 by treating the appropriate Mannich base with dimethylhydrazine in ethanol.

Example 4

1,2,5-Trimethyl-3-phenyl-3-pyrazoline

Method A

Prepare a solution of 0.1 mole of phenyl propenyl ketone, 0.1 mole of 1,2-dimethylhydrazine (dihydrochloride) and a few drops of hydrochloric acid in 100 ml. of absolute ethanol. Heat the solution for three hours at reflux temperature, distill the solvent in vacuo and make the resultant residue alkaline by adding dilute aqueous sodium carbonate in the cold. Extract the aqueous mixture with ether, combine the ether extract, evaporate the ethereal solution to a residue comprising 1,2,5-trimethyl-3-phenyl-3-pyrazoline. Purify by distillation, b.p.=120°–130°C/20 mm. Hg.; yield = 5–6 g.

Method B

Prepare a solution of 0.1 mole of phenyl propenyl ketone, 0.1 mole of 1,2-dimethylhydrazine and a catalytic quantity of p-toluenesulfonic acid in 100 ml. of absolute ethanol. Heat the solution at reflux temperature for 12 hours, then evaporate the solvent in vacuo and distill the residue to obtain 9.92 g. of 1,2,5-trimethyl-3-phenyl-3-pyrazoline, b.p. =120°–130°C/20 mm. Hg.

Example 5

1,2-Dimethyl-4-phenyl-3-pyrazoline

To 0.01 moles of 1,2-dimethyl-4-phenylpyrazolium iodide in 150 ml. of anhydrous ether, add 0.012 moles of lithium aluminum hydride in ether. Heat the reaction mixture at reflux temperature for three hours, then destroy the excess hydride and the reduction complex by crushed ice. Filter the solid phase and wash several times with ether. Dry the combined filtrates over sodium sulfate and distill to a residue comprising 1,2-dimethyl-4-phenyl-3-pyrazoline. Purify by recrystallization from petroleum ether, m.p. =90°–95°C.

The above procedure can also be carried out using tetrahydrofuran as solvent instead of ether.

Example 6

1,2,4,5-Tetramethyl-3-phenyl-3-pyrazoline

In a manner similar to that described in Example 5, treat 1,2,4,5-tetramethyl-3-phenylpyrazolium iodide in ether with lithium aluminum hydride. Isolate and purify the resultant product in a manner similar to that described in Example 4 to obtain 1,2,4,5-tetramethyl-3-phenyl-3-pyrazoline, b.p. =130°–135°C/20 mm. Hg.

Similarly, by treating 1,2-dimethyl-3,4-diphenylpyrazolium iodide with lithium aluminum hydride there is obtained 1,2-dimethyl-3,4-diphenyl-3-pyrazoline, b.p. =100°C/5 mm. Hg.

Example 7

1,2,3-Trimethyl-4-phenyl-3-pyrazoline and
1,2,3-trimethyl-4-(p-chlorophenyl) -3-pyrazoline Prepare the Mannich base of methyl benzyl ketone according to known procedures by reaction thereof with formaldehyde and dimethylamine hydrochloride in ethanol.

Prepare a solution of 0.1 mole of the Mannich base of methyl benzyl ketone and 0.1 mole of 1,2-dimethylhydrazine in 100 ml. of absolute ethanol. Heat the solution at reflux temperature for 12 hours and evaporate the solvent in vacuo to a residue comprising 1,2,3-trimethyl-4-phenyl-3-pyrazoline. Purify by distillation, b.p. =103°–110°C/2.0 mm. Hg. Purify further by recrystallization from hexane, m.p. = 48°–50°C.

In a manner similar to that described hereinabove, prepare the Mannich base of methyl p-chlorobenzyl ketone and treat it with an equimolar quantity of dimethylhydrazine in absolute ethanol. Isolate and purify the resultant product in a manner similar to that to obtain 1,2,3-trimethyl-4-(p-chlorophenyl) -3-pyrazoline, b.p. =146°–155°C/8.0 mm. Hg., which can be further purified by crystallization from petroleum ether, m.p. =75°–76°C.

Example 8

1,2-Dimethyl-3,5-diphenyl-3-pyrazoline

In a manner similar to that described in Example 4, Preparation B, treat chalcone (benzylideneacetophenone) with an equimolar quantity of 1,2-dimethylhydrazine in absolute ethanol in the presence of a catalytic quantity of p-toluene-sulfonic acid. Isolate and purify the resultant product in a manner similar to that described to obtain 1,2-dimethyl-3,5-diphenyl-3-pyrazoline, b.p. =160°–165°C/0.05 mm. Hg.

Example 9

Perchlorate Salts of 1,2-Dimethyl-3-pyrazolines

Add 70 percent aqueous perchloric acid to a solution of the 1,2-dimethyl-3-pyrazoline in ethanol. The resultant perchlorate salt, i.e., the 1,2-dimethyl-2- pyrazolinium perchlorate usually precipitates from solution. Add anhydrous ether to the ethanolic solution to obtain additional perchlorate salt. The perchlorate salts can be purified by recrystallization usually from ethanol or from ethanol-ether.

The following perchlorate salts are obtained by utilizing the above procedure, the recrystallizing solvent being indicated in parentheses by the melting point:

1,2-dimethyl-3-phenyl-2-pyrazolinium perchlorate, m.p. = 135°–136°C (ethanol), 1,2,4-trimethyl-3-phenyl-2-pyrazolinium perchlorate, m.p. = 131°–132°C (ethanol-ether), 1,2-dimethyl-3-(p-tolyl)-2-pyrazolinium perchlorate, m.p. = 105°–107°C (ethanol), 1,2-dimethyl-3-(p-chlorophenyl)-2-pyrazolinium perchlorate, m.p. = 157°–158°C (methanol-ether), 1,2-dimethyl-3-(p-fluorophenyl)-2pyrazolinium perchlorate, m.p. = 137°–138°C (ethanol), 1,2-dimethyl-3-(p-bromophenyl)-2-pyrazolinium perchlorate, m.p. = 183°–185°C (ethanol), 1,2-dimethyl-3-(p-methoxyphenyl)-2-pyrazolinium perchlorate, m.p. = 153°–155°C (ethanol), 1,2-dimethyl-3-(3',4'-dimethylphenyl)-2-pyrazolinium perchlorate, m.p. = 65°–66°C (ethanol-ether), 1,2-dimethyl-3-(m-tolyl)-2-pyrazolinium perchlorate, m.p. = 82°–83°C (ethanol), 1,2-dimethyl-3-(m-fluorophenyl)-2-pyrazolinium perchlorate, m.p. = 90°–95°C (ethanol), 1,2,5-trimethyl-3-phenyl-2-pyrazolinium perchlorate, m.p. = 143°–145°C (ethanol), 1,2,4,5-tetramethyl-3-phenyl-2-pyrazolinium perchlorate, m.p. = 140°–144°C (ethanol), 1,2-dimethyl-3,4-diphenyl-2-pyrazolinium perchlorate, m.p. = 180°C (ethanol), 1,2,3-trimethyl-4-phenyl-2-pyrazolinium perchlorate, m.p. = 120°–121°C (ethanol), 1,2,3-trimethyl-4-(p-chlorophenyl)-2-pyrazolinium perchlorate, m.p. = 137°–138°C (ethanol-ether), 1,2-dimethyl-3,5-diphenyl-2-pyrazolinium perchlorate, m.p. = 192–195°C (ethanol, and 1,2-dimethyl-4-ethyl-3-phenyl-2-pyrazolinium perchlorate.

Example 10

1,1,2,3-Tetramethyl-4-phenyl-3-pyrazolinium iodide

Heat at reflux temperature a solution of 0.01 moles of 1,2,3-trimethyl-4-phenyl-3-pyrazoline and 0.012 moles of methyl iodide in absolute ethanol. Cool the reaction mixture and precipitate the resultant methiodide quaternary salt by the dropwise addition of ether. Purify by crystallization from ethanol to obtain 1,1,2,3-tetramethyl-4-phenyl-3-pyrazolinium iodide, m.p. = 202°C.

In a manner similar to that described hereinabove, there is prepared the methyl iodide quaternary salts of the 1,2-dimethyl-3pyrazolines of Examples 1–8.

In the above procedure, by substituting other lower alkyl halides, e.g. ethyl chloride and propyl bromide for methyl iodide, there is obtained the corresponding alkyl halide quaternary salts of the compounds of Examples 1–8.

Example 11

Preparation of Hard-Shell Capsule Containing 1,2-Dimethyl-3-(p-tolyl)-2-pyrazolinium perchlorate

| Capsule Formula: | mg/Capsule |
|---|---|
| 1,2-Dimethyl-3-(p-tolyl)-2-pyrazolinium perchlorate | 20.0 |
| Lactose, Hydrous, U.S.P. | 204.5 |
| Magnesium Stearate, U.S.P. | 0.5 |
| | 225.0 |

Blend and mill the 1,2-dimethyl-3-(p-tolyl)-2-pyrazolinium perchlorate; add the magnesium stearate; mix; and fill into hard gelatin capsules.

Example 12

Preparation of Tablet Compositions Containing 1,2,4-Trimethyl-3-phenyl-2-pyrazolinium perchlorate

| Tablet Formula: | mg/Tablet |
|---|---|
| 1,2,4-Trimethyl-3-phenyl-2-pyrazolinium perchlorate | 50.00 |
| Monocalcium Phosphate, U.S.P. | 31.00 |
| Lactose, U.S.P. | 100.00 |
| Polyvinylpyrrolidone | 8.00 |
| Corn Starch, Food Grade | 10.00 |
| Magnesium Stearate | 1.00 |
| | 200.00 |

Blend the 1,2,4-trimethyl-3-phenyl-2-pyrazolinium perchlorate with the monocalcium phosphate and lactose; granulate the blend using a solution of polyvinylpyrrolidone; dry; reduce to granules of suitable size; add the corn starch and magnesium stearate; mix; and compress into tablets.

Example 13

Preparation of Tablet Compositions Containing 1,2-Dimethyl-3-phenyl-2-pyrazolinium perchlorate

| Tablet Formula: | mg/Tablet |
|---|---|
| 1,2-Dimethyl-3-phenyl-2-pyrazolinium perchlorate | 100.00 |
| Confectioners Sugar, Food Grade | 123.00 |
| Polyvinylpyrrolidone | 10.00 |
| Corn Starch, Food Grade | 15.00 |
| Magneisum Stearate, U.S.P. | 2.00 |
| | 250.00 |

Prepare a damp mass consisting of the 1,2-dimethyl-3-phenyl-2-pyrazolinium perchlorate, confectionery sugar and polyvinylpyrrolidone; dry; reduce to granules; add the corn starch and magnesium stearate; mix; and compress into tablets.

Example 14

Preparation of Tablet Compositions Containing 1,2,4,5-Tetramethyl-3-phenyl-2-pyrazolinium perchlorate

| Tablet Formula: | mg/Tablet |
|---|---|
| 1,2,4,5-Tetramethyl-3-phenyl-2-pyrazolinium perchlorate | 350.00 |
| Calcium Sulfate, Dihydrate, U.S.P. | 110.00 |
| Pregelatinized Corn Starch, Food Grade | 15.00 |
| Starch (Corn or Potato), Food Grade | 52.50 |
| Magnesium Stearate, U.S.P. | 2.50 |
| | 530.00 |

Prepare a damp mass consisting of 1,2,4,5-tetramethyl-3-phenyl-2-pyrazolinium perchlorate, calcium sulfate and pregelatinized corn starch; dry; reduce to granules; add the corn starch (or potato) and magnesium stearate; mix; and compress into tablets.

I claim:

1. An orally administrable composition for the lowering of blood sugar levels in warm blooded animal subjects suffering from hyperglycemia comprising a pharmaceutically acceptable carrier and an effective blood sugar lowering amount of a compound selected from the group consisting of 1,2-dilower alkyl-3-pyrazoline of the following formula:

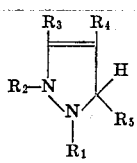

wherein each of $R_1$ and $R_2$ is lower alkyl of one to four carbon atoms; and each of $R_3$, $R_4$ and $R_5$ is a member selected from the group consisting of hydrogen, alkyl having up to 10 carbon atoms, benzyl, phenyl, phenyl substituted by alkyl having one to four carbon atoms, and phenyl substituted by halogen or methoxy;
  with the proviso that at least one of $R_3$ and $R_4$ must be phenyl or phenyl substituted by a member selected from the group consisting of halogen, lower alkyl of one to four carbon atoms, and methoxy;
  and with the proviso that when $R_3$ is hydrogen and $R_4$ is phenyl or substituted phenyl, $R_5$ is hydrogen and
  a pharmaceutically acceptable acid addition salt thereof and
  a pharmaceutically acceptable quaternary salt thereof.

2. The composition of claim 1 comprising a pharmaceutically acceptable carrier and an effective amount of the perchloric acid addition salt of a 1,2-dilower alkyl-3-pyrazoline defined by the formula therein.

3. The composition of claim 1 comprising a pharmaceutically acceptable carrier and the perchloric acid addition salt of a 1,2-dilower alkyl-3-pyrazoline of the formula therein, wherein $R_1$ and $R_2$ are each methyl.

4. The composition of claim 1 comprising a pharmaceutically acceptable carrier and the perchloric acid addition salt of a 1,2-dilower alkyl-3-aryl-3-pyrazoline of the formula therein, wherein $R_1$ and $R_2$ are each methyl and $R_3$ is a member selected from the group consisting of phenyl and phenyl substituted by methyl.

5. The composition of claim 1 comprising a pharmaceutically acceptable carrier and the perchloric acid addition salt of a 1,2-dilower alkyl-3-aryl-3-pyrazoline of the formula therein, wherein $R_1$ and $R_2$ are each methyl, $R_3$ is a member selected from the group consisting of phenyl and phenyl substituted by methyl, $R_4$ and $R_5$ are each members selected from the group consisting of hydrogen, methyl and phenyl.

6. The composition of claim 1 containing the perchloric acid addition salt of a 1,2-dilower alkyl-3-aryl-3-pyrazoline of the formula therein, wherein $R_1$, $R_2$ and $R_5$ are each methyl, $R_3$ is phenyl, and $R_4$ is hydrogen.

7. The composition of claim 1 containing the perchloric acid addition salt of a 1,2-dilower alkyl-3-aryl-3-pyrazoline of the formula therein, wherein $R_1$, $R_2$ and $R_4$ are methyl, $R_3$ is phenyl and $R_5$ is hydrogen.

8. The composition of claim 1 containing the perchloric acid addition salt of a 1,2-dilower alkyl-3-aryl-3-pyrazoline of the formula therein, wherein $R_1$ and $R_2$ are each methyl, $R_3$ and $R_4$ are each phenyl, and $R_5$ is hydrogen.

9. The composition of claim 1 containing the perchloric acid addition salt of a 1,2-dilower alkyl-3-aryl-3-pyrazoline of the formula therein, wherein $R_1$ and $R_2$ are each methyl, $R_3$ is phenyl and $R_4$ and $R_5$ are each hydrogen.

10. The composition of claim 1 containing the perchloric acid addition salt of a 1,2-dilower alkyl-3-aryl-3-pyrazoline of the formula therein, wherein $R_1$ and $R_2$ are each methyl, $R_3$ is p-tolyl, and $R_4$ and $R_5$ are each hydrogen.

11. The composition of claim 1 containing the perchloric acid addition salt of a 1,2dilower alkyl-3-aryl-3pyrazoline of the formula therein, wherein $R_1$ and $R_2$ are each methyl, $R_3$ is p-tolyl, and $R_4$ and $R_5$ are hydrogen.

12. The composition of claim 1 containing the perchloric acid addition salt of a 1,2-dilower alkyl-3-aryl-3-pyrazoline of the formula therein, wherein $R_1$, $R_2$, $R_4$, and $R_5$ are each methyl, and $R_3$ is phenyl.

13. The composition of claim 1 containing the perchloric acid addition salt of a 1,2-dilower alkyl-3-aryl-3-pyrazoline of the formula therein, wherein $R_1$ and $R_2$ are methyl, $R_3$ is 3',4'-dimethylphenyl, and $R_4$ and $R_5$ are hydrogen.

14. A process for lowering of blood sugar levels in warm blooded animal subjects *suffering from hyperglycemia* which comprises orally administering to such subjects an effective blood sugar lowering amount of a compound selected from the group consisting of a 1,2-dilower alkyl-3-pyrazoline of the following formula:

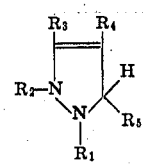

wherein each of $R_1$ and $R_2$ is a lower alkyl of one to four carbon atoms; and each of $R_3$, $R_4$ and $R_5$ is a member selected from the group consisting of hydrogen, alkyl having up to 10 carbon atoms, benzyl, phenyl, phenyl substituted by alkyl having one to four carbon atoms, and phenyl substituted by halogen or methoxy;
  with the proviso that at least one of $R_3$ and $R_4$ must be phenyl or phenyl substituted by a member selected from the group consisting of halogen, lower alkyl of one to four carbon atoms, and methoxy;
  and with the proviso that when $R_3$ is hydrogen and $R_4$ is phenyl or substituted phenyl, $R_5$ is hydrogen;
  a pharmaceutically acceptable acid addition salt thereof, and
  a pharmaceutically acceptable quaternary salt thereof.

15. The process of claim 14 wherein the compound administered is a perchloric acid addition salt of a 1,2-dilower alky-3-pyrazoline of the formula shown therein.

16. The process of claim 14 wherein the compound administered is a perchloric acid addition salt of a 1,2-dilower alkyl-3-pyrazoline of the formula wherein $R_1$ and $R_2$ are each methyl.

17. The process of claim 14 wherein the compound administered is a perchloric acid addition salt of a 1,2-dilower alkyl-3-aryl-3-pyrazoline of the formula wherein $R_1$ and $R_2$ are each methyl, and $R_3$ is a member selected from the group consisting of phenyl and phenyl substituted by methyl.

18. The process of claim 14 wherein the compound administered in a perchloric acid addition salt of a 1,2-dilower alkyl-3-aryl-3-pyrazoline of the formula wherein $R_1$ and $R_2$ are each methyl, $R_3$ in a member selected from the group consisting of phenyl and phenyl substituted by methyl, and $R_4$ and $R_5$ are each members selected from the group consisting of hydrogen, methyl and phenyl.

19. The process of claim 14 wherein the administered compound is the perchloric acid addition salt of a 1,2-dilower alkyl-3-aryl-3-pyrazoline of the formula wherein $R_1$, $R_2$ and $R_5$ are each methyl, $R_3$ is phenyl, and $R_4$ is hydrogen.

20. The process of claim 14 wherein the compound administered is a perchloric acid addition salt of a 1,2-dilower alkyl-3-aryl-3-pyrazoline of the formula wherein $R_1$, $R_2$ and $R_4$ are methyl, $R_3$ is phenyl, and $R_5$ is hydrogen.

21. The process of claim 14 wherein the compound administered is a perchloric acid addition salt of a 1,2-dilower alkyl-3-aryl-3-pyrazoline of the formula wherein $R_1$ and $R_2$ are each methyl, $R_3$ and $R_5$ are each phenyl, and $R_4$ is hydrogen.

22. The process of claim 14 wherein the compound administered is a perchloric acid addition salt of a 1,2-dilower alkyl-3-aryl-3-pyrazoline of the formula wherein $R_1$ and $R_2$ are each methyl, $R_3$ is phenyl, and $R_4$ and $R_5$ are hydrogen.

23. The process of claim 14 wherein the compound administered is a perchloric acid addition salt of a 1,2-dilower alkyl-3-aryl-3-pyrazoline of the formula wherein $R_1$ and $R_2$ are each methyl, $R_3$ is p-tolyl, and $R_4$ and $R_5$ are each hydrogen.

24. The process of claim 14 wherein the administered compound is a perchloric acid addition salt of a 1,2-dilower alkyl-3-aryl-3-pyrazoline of the formula wherein $R_1$ and $R_2$ are each method, $R_3$ in m-tolyl, and $R_4$ and $R_5$ are hydrogen.

25. The process of claim 14 wherein the administered compound is a perchloric acid addition salt of a 1,2-dilower alkyl-3-aryl-3-pyrazoline of the formula wherein $R_1$, $R_2$, $R_4$ and $R_5$ are each methyl and $R_3$ is phenyl.

26. The process of claim 14 wherein the administered compound is a perchloric acid addition salt of a 1,2-dilower alkyl-3-aryl-3-pyrazoline of the formula wherein $R_1$ and $R_2$ are methyl, $R_3$ in 3′,4′-dimethylphenyl, and $R_4$ and $R_5$ are hydrogen.

* * * * *

UNITED STATES PATENT OFFICE
CERTIFICATE OF CORRECTION

PATENT NO. : 3,818,095
DATED : June 18, 1974
INVENTOR(S) : Robert Jacquier

It is certified that error appears in the above-identified patent and that said Letters Patent are hereby corrected as shown below:

Column 2, line 67, "-1-ethyl-3-pyrazolinium" should read ---1-ethyl-3-phenyl-3-pyrazolinium---. Column 6, lines 1 and 2, "e.g. 1,2diethyl-" should read ---(e.g. 1,2-diethyl---.

Column 9, line 18, "-3-(pchlorophenyl)-" should read ---3-(p-chlorophenyl)---. Column 9, line 30, "1,2dimethyl-" should read ---1,2-dimethyl---. Column 11, line 17, "-2pyrazolinium" should read ---2-pyrazolinium---. Column 12, line 48, "Magneisum Stearate," should read ---Magnesium Stearate,---. Column 14, line 26, Claim 11, "$R_3$ is p-tolyl," should read ---$R_3$ is m-tolyl,---. Column 15, line 16, Claim 18, "administered in a" should read ---administered is a---. Column 15, line 18, Claim 18, "$R_3$ in a member" should read "$R_3$ is a member---. Column 16, line 19, Claim 24, "and $R_2$ are each method, $R_3$ in m-tolyl," should read ---and $R_2$ are each methyl, $R_3$ is m-tolyl,---. Column 16, line 29, claim 26, "$R_3$ in 3'," should read ---$R_3$ is 3',---.

Signed and Sealed this sixth Day of January 1976

[SEAL]

Attest:

RUTH C. MASON
*Attesting Officer*

C. MARSHALL DANN
*Commissioner of Patents and Trademarks*